US010099292B2

(12) United States Patent
Coakley

(10) Patent No.: US 10,099,292 B2
(45) Date of Patent: Oct. 16, 2018

(54) CRASH RESISTANT TRIP FOR A PIPE MACHINING APPARATUS

(71) Applicant: Illinois Tool Works Inc., Glenview, IL (US)

(72) Inventor: Roy C. Coakley, Northlake, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/235,349

(22) Filed: Aug. 12, 2016

(65) Prior Publication Data

US 2017/0043417 A1 Feb. 16, 2017

Related U.S. Application Data

(60) Provisional application No. 62/204,203, filed on Aug. 12, 2015.

(51) Int. Cl.
  *B23B 5/16* (2006.01)
  *B23B 3/26* (2006.01)
  (Continued)

(52) U.S. Cl.
  CPC .............. *B23B 5/163* (2013.01); *B23B 1/00* (2013.01); *B23B 3/26* (2013.01); *B23B 2210/08* (2013.01); *B23B 2215/72* (2013.01)

(58) Field of Classification Search
  CPC ....... B23B 2215/72; B23B 5/163; B23B 3/26; B23B 2210/08; B23Q 9/0021; B23Q 9/0057
  See application file for complete search history.

(56) References Cited

U.S. PATENT DOCUMENTS

| 257,833 | A | 5/1882 | Warren et al. |
| 768,128 | A | 5/1904 | Jackson |

(Continued)

FOREIGN PATENT DOCUMENTS

| AU | 2006282045 A1 | 6/2006 |
| CN | 85102879 | 1/1986 |

(Continued)

OTHER PUBLICATIONS

International Search Report and Written Opinion for PCT/US2013/077718 dated Sep. 5, 2014, 14 pages.

(Continued)

*Primary Examiner* — Sara Addisu
(74) *Attorney, Agent, or Firm* — Klintworth & Rozenblat IP LLP

(57) ABSTRACT

A pipe machining apparatus includes a frame, a tool support, an advancement device, and an advancement member. The tool support is coupled to and movable relative to the frame. The tool support is adapted to support a tool and move the tool in a direction toward a pipe at an increment. The advancement device includes an advancement projection fixedly attached to the frame. The advancement projection includes a contact-surface. The advancement member is coupled to the tool support. Upon the advancement member contacting the contact-surface of the advancement projection the advancement member is adapted to advance the tool towards the pipe at the increment. The contact-surface of the advancement projection is shaped to always be in a non-perpendicular contact position with the advancement member.

12 Claims, 10 Drawing Sheets

(51) Int. Cl.
  *B23B 3/22*  (2006.01)
  *B23B 1/00*  (2006.01)

(56) References Cited

U.S. PATENT DOCUMENTS

| | | | |
|---|---|---|---|
| 1,074,334 A | 9/1913 | Vosper | |
| 1,097,152 A | 5/1914 | Wagner | |
| 1,140,208 A | 5/1915 | Taylor | |
| 1,225,209 A | 5/1917 | Beaulieu | |
| 1,279,022 A | 9/1918 | Scott | |
| 1,323,092 A | 11/1919 | Palmer | |
| 1,886,082 A | 11/1932 | Chapman | |
| 1,979,966 A | 11/1934 | Farr et al. | |
| 1,985,541 A | 12/1934 | Hoefer | |
| RE20,974 E | 1/1939 | Guirl et al. | |
| 2,230,569 A | 2/1941 | Howard et al. | |
| 2,275,327 A | 3/1942 | Severson | |
| 2,358,741 A | 9/1944 | Shelby | |
| 2,364,963 A | 12/1944 | Elliott | |
| 2,537,916 A | 1/1951 | Rosenboom | |
| 2,567,833 A | 9/1951 | Warren et al. | |
| 2,635,270 A | 4/1953 | Dawson | |
| 2,798,390 A | 7/1957 | Bennett | |
| 2,842,238 A | 7/1958 | Shaw | |
| 2,931,659 A | 4/1960 | Novkov | |
| 2,968,375 A | 1/1961 | Avery, Sr. | |
| 3,078,547 A | 2/1963 | Sweet | |
| 3,253,336 A | 5/1966 | Brown | |
| 3,371,567 A | 3/1968 | Wayne | |
| 3,431,646 A * | 3/1969 | Young | B23B 5/163 30/97 |
| 3,455,002 A | 7/1969 | Miller | |
| 3,645,308 A | 2/1972 | Nilsson | |
| 3,650,514 A | 3/1972 | Stunkard | |
| 3,732,618 A | 5/1973 | Lorenz | |
| 3,732,758 A | 5/1973 | Rinaldo | |
| 3,807,047 A | 4/1974 | Sherer | |
| 3,819,163 A | 6/1974 | Stunkard | |
| 3,848,489 A | 11/1974 | Santana | |
| 3,893,356 A | 7/1975 | Atzberger | |
| 3,908,491 A | 9/1975 | Gilmore | |
| 3,915,246 A | 10/1975 | Sheshtawy | |
| 3,942,248 A | 3/1976 | Sherer | |
| 4,050,335 A | 9/1977 | Gilmore | |
| 4,063,355 A | 12/1977 | Netzel | |
| 4,104,937 A | 8/1978 | Breaux | |
| 4,111,083 A | 9/1978 | Carter | |
| 4,112,794 A | 9/1978 | Franks | |
| 4,114,484 A | 9/1978 | Feamster, III | |
| 4,211,510 A | 7/1980 | Hopkins | |
| 4,217,061 A | 8/1980 | Eiland | |
| 4,318,391 A | 3/1982 | Wachs et al. | |
| 4,366,994 A | 1/1983 | Yoshioka | |
| 4,391,458 A | 7/1983 | Blakeley | |
| 4,397,363 A | 8/1983 | Fuller | |
| 4,397,487 A | 8/1983 | Guttman | |
| 4,402,136 A | 9/1983 | Rast | |
| 4,411,178 A | 10/1983 | Wachs | |
| 4,421,441 A | 12/1983 | Hirose | |
| 4,482,136 A | 11/1984 | Wolf et al. | |
| 4,483,223 A | 11/1984 | Nall et al. | |
| 4,490,909 A | 1/1985 | Wachs et al. | |
| 4,493,150 A | 1/1985 | Garcia | |
| 4,499,934 A | 2/1985 | Rautio | |
| 4,543,861 A | 10/1985 | Kwech et al. | |
| 4,608,755 A | 9/1986 | Braasch | |
| 4,614,136 A | 9/1986 | Pertle | |
| 4,625,464 A | 12/1986 | Kubo | |
| 4,637,285 A | 1/1987 | Mizoguchi | |
| 4,640,159 A | 2/1987 | Stojanovski | |
| 4,655,108 A | 4/1987 | Galos | |
| 4,677,884 A | 7/1987 | Kwech et al. | |
| 4,682,919 A | 7/1987 | Mitchell | |
| 4,739,685 A * | 4/1988 | Ricci | B23B 3/26 30/97 |
| 4,750,392 A | 6/1988 | Hong | |
| 4,762,038 A | 8/1988 | Olson | |
| 4,770,074 A | 9/1988 | Kwech | |
| 4,791,842 A | 12/1988 | Olson | |
| 4,813,314 A | 3/1989 | Kwech | |
| 4,825,543 A | 5/1989 | Thalmann | |
| 4,829,860 A | 5/1989 | VanderPol | |
| 4,880,340 A | 11/1989 | Taki et al. | |
| 4,936,718 A | 6/1990 | Proffitt | |
| 4,939,964 A | 7/1990 | Ricci | |
| 4,944,205 A * | 7/1990 | Ricci | B23B 3/26 82/113 |
| 5,002,440 A | 3/1991 | Tamaoki et al. | |
| 5,013,015 A | 5/1991 | Fatheree | |
| 5,050,291 A | 9/1991 | Gilmore | |
| 5,054,342 A | 10/1991 | Swiatowy et al. | |
| 5,063,799 A | 11/1991 | Brewer | |
| 5,070,600 A | 12/1991 | Brew et al. | |
| 5,096,327 A | 3/1992 | Ruland | |
| 5,119,703 A | 6/1992 | Ruby | |
| 5,159,868 A | 11/1992 | Thomas et al. | |
| 5,199,928 A | 4/1993 | Gress et al. | |
| 5,211,212 A | 5/1993 | Carlson | |
| 5,361,659 A | 11/1994 | Hanson | |
| 5,368,399 A | 11/1994 | Tremblay | |
| 5,394,776 A | 3/1995 | Robinson | |
| 5,429,021 A | 7/1995 | Astle et al. | |
| 5,467,627 A | 11/1995 | Smith et al. | |
| 5,549,024 A | 8/1996 | Ricci | |
| 5,557,995 A * | 9/1996 | Robinson | B23B 41/00 407/103 |
| 5,603,250 A | 2/1997 | Robinson | |
| 5,609,081 A | 3/1997 | Lin | |
| 5,660,093 A | 8/1997 | Ricci | |
| 5,775,188 A | 7/1998 | Strait | |
| 5,778,746 A | 7/1998 | Keller | |
| 5,894,772 A | 4/1999 | Nodar | |
| 5,941,145 A | 8/1999 | Marshall | |
| 5,943,927 A | 8/1999 | Hanson | |
| 5,954,462 A | 9/1999 | Way et al. | |
| 6,038,947 A * | 3/2000 | Tremblay | B23B 3/26 82/113 |
| 6,065,378 A | 5/2000 | Ricci | |
| 6,146,067 A | 11/2000 | Owens | |
| 6,227,577 B1 | 5/2001 | Ikeda | |
| 6,257,110 B1 | 7/2001 | Ricci et al. | |
| 6,293,174 B1 | 9/2001 | Rulseh | |
| 6,615,696 B2 | 9/2003 | Ricci | |
| 6,619,164 B1 | 9/2003 | Ricci et al. | |
| 6,810,587 B1 | 11/2004 | Robertson | |
| 6,854,367 B2 | 2/2005 | Ericksson | |
| 6,880,832 B2 | 4/2005 | DeRosa | |
| 6,966,731 B2 | 11/2005 | VanderPol et al. | |
| 7,000,510 B1 | 2/2006 | Place | |
| 7,140,812 B2 | 11/2006 | Bryan | |
| 7,267,035 B2 | 9/2007 | Uebelhart | |
| 7,270,505 B2 | 9/2007 | VanderPol et al. | |
| 7,337,698 B2 | 3/2008 | DiBiase | |
| 7,383,758 B2 | 6/2008 | Place | |
| 7,510,462 B2 | 3/2009 | Bryan | |
| 7,757,591 B2 | 7/2010 | Trice | |
| 7,992,473 B2 | 8/2011 | Marple | |
| 8,051,753 B2 | 11/2011 | Ricci | |
| 8,186,249 B2 | 5/2012 | Sasu | |
| 8,250,953 B2 | 8/2012 | Hall et al. | |
| 8,534,170 B2 | 9/2013 | Arnemann | |
| 8,584,557 B2 * | 11/2013 | Hall | B23B 3/26 82/113 |
| 8,584,558 B2 | 11/2013 | Phillips et al. | |
| 8,667,693 B2 | 3/2014 | Ellis | |
| 9,021,927 B2 * | 5/2015 | Phillips, II | B23B 3/26 82/113 |
| 9,050,669 B2 | 6/2015 | Coakley | |
| 9,278,417 B2 * | 3/2016 | Pierce | B23D 21/04 |
| 2001/0001935 A1 | 5/2001 | Wilk, Jr. | |
| 2003/0106397 A1 | 6/2003 | Ricci | |
| 2004/0035171 A1 | 2/2004 | Gormany | |
| 2004/0234352 A1 * | 11/2004 | Vanderpol | B23C 3/122 409/178 |

(56) References Cited

U.S. PATENT DOCUMENTS

| | | |
|---|---|---|
| 2005/0132851 A1 | 6/2005 | Place |
| 2005/0155471 A1 | 7/2005 | Ricci |
| 2006/0092674 A1 | 5/2006 | Belton |
| 2006/0207395 A1 | 9/2006 | Place |
| 2007/0241250 A1 | 10/2007 | Wong |
| 2007/0289422 A1 | 12/2007 | Place |
| 2008/0005907 A1 | 1/2008 | Scheffer |
| 2009/0229919 A1 | 9/2009 | McDonald |
| 2010/0062887 A1 | 3/2010 | Bodensteiner et al. |
| 2010/0162860 A1 | 7/2010 | Hall et al. |
| 2010/0162862 A1 | 7/2010 | Hall et al. |
| 2011/0041658 A1 | 2/2011 | Weinbeg |
| 2011/0083537 A1 | 4/2011 | Place |
| 2011/0219920 A1 | 9/2011 | Arnemann |
| 2013/0152748 A1 | 6/2013 | Wokan et al. |
| 2013/0239762 A1 | 9/2013 | Place |
| 2014/0096655 A1 | 4/2014 | Coakley |
| 2014/0096662 A1 | 4/2014 | Coakley |
| 2014/0190322 A1 | 7/2014 | Pierce et al. |
| 2014/0190327 A1 | 7/2014 | Pierce |
| 2014/0196582 A1 | 7/2014 | Pierce et al. |
| 2015/0107425 A1 | 4/2015 | Walton |
| 2016/0136741 A1* | 5/2016 | Pierce .................... B23D 21/04 82/70.2 |
| 2017/0191525 A1* | 7/2017 | Coakley ................. F16C 19/54 |

FOREIGN PATENT DOCUMENTS

| | | |
|---|---|---|
| CN | 87101953 | 9/1988 |
| CN | 2109276 | 7/1992 |
| CN | 2126125 U | 12/1992 |
| CN | 1093959 A | 10/1994 |
| CN | 2254385 Y | 5/1997 |
| CN | 2274107 Y | 2/1998 |
| CN | 2475496 | 2/2002 |
| CN | 1562545 | 1/2005 |
| CN | 2761329 | 3/2006 |
| CN | 2934709 Y | 8/2007 |
| CN | 201008978 | 1/2008 |
| CN | 101384393 | 3/2009 |
| CN | 101573198 A | 11/2009 |
| CN | 201482987 U | 5/2010 |
| CN | 101932400 A | 12/2010 |
| CN | 203925294 U | 11/2014 |
| DE | 900042 | 12/1953 |
| DE | 2439852 | 3/1976 |
| DE | 3521697 A1 | 2/1986 |
| DE | 3603618 | 10/1987 |
| DE | 10020393 | 2/2001 |
| DE | 102007013503 | 9/2008 |
| DE | 102008025716 | 12/2009 |
| DE | 102009005983 | 7/2010 |
| EP | 0819501 | 1/1998 |
| EP | 2 213 399 A1 | 8/2010 |
| FR | 2641487 | 7/1990 |
| GB | 818753 A | 8/1959 |
| GB | 828940 A | 2/1960 |
| GB | 1450774 A | 9/1976 |
| GB | 2242850 | 10/1991 |
| NL | 7907801 A | 4/1981 |
| NL | 1038144 C | 1/2012 |
| TW | 201129436 A | 9/2011 |
| WO | 2007024326 A1 | 3/2007 |
| WO | 2007/052035 A1 | 5/2007 |
| WO | 2010/077346 A1 | 7/2010 |
| WO | 2010077349 | 7/2010 |
| WO | 2012071419 | 5/2012 |
| WO | 2014055610 | 4/2014 |
| WO | 2014109910 | 7/2014 |

OTHER PUBLICATIONS

International Search Report and Written Opinion for PCT/US2013/077719 dated Jul. 4, 2014, 18 pages.

International Search Report and Written Opinion for PCT/US2013/077721 dated Aug. 22, 2014, 19 pages.

International Search Report and Written Opinion for PCT/US2016/046690 dated Oct. 24, 2016, 14 pages.

International Search Report and Written Opinion from corresponding International Application PCT/US16/46416 dated Nov. 7, 2016, 12 pages.

International Search Report and Written Opinion for PCT/US2014/058814 dated Dec. 15, 2014, 8 pages.

International Search Report and Written Opinion for PCT/US2013/062999 dated Jan. 29, 2014, 11 pages.

International Search Report and Written Opinion for PCT/US2013/062987 dated Feb. 20, 2014, 10 pages.

International Search Report and Written Opinion for PCT/US2013/063007 dated Jan. 22, 2014, 14 pages.

International Search Report and Written Opinion for PCT/US2013/063023 dated Jun. 2, 2014, 15 pages.

International Search Report and Written Opinion for PCT/US2016/020481 dated Jun. 13, 2016, 11 pages.

HST2121, "H&S Tool Clamshell.mpg," Dec. 22, 2009, Published on YouTube, https://www.youtubecom/watch?v=Okfh-ODTj-8.

International Search Report and Written Opinion for PCT/US2015/056015 dated Mar. 31, 2016, 17 pages.

International Search Report and Written Opinion for PCT/US2015/056006 dated Mar. 31, 2016, 15 pages.

* cited by examiner

CRASH RESISTANT TRIP FOR A PIPE MACHINING APPARATUS

RELATED APPLICATIONS

This application claims the domestic priority of U.S. Provisional Application Ser. No. 62/204,203, filed on Aug. 12, 2015, the contents of which are incorporated herein in its entirety.

FIELD OF THE INVENTION

The present disclosure generally relates to crash resistant trips for pipe machining apparatuses and, more particularly, to crash resistant trips for pipe machining apparatuses for machining large diameter pipes.

BACKGROUND

A variety of different types of pipe machining apparatuses exist to perform various machining processes on pipes. One such process includes cutting pipes. Large diameter pipes may be cut with a split frame pipe machining apparatus, which includes two frame halves that surround the pipe from respective sides and are coupled together around the pipe. Such a pipe cutter includes a tool or cutting device that encircles the pipe and moves toward the pipe in small increments during the cutting process in order to slowly cut into the pipe. Eventually, after many small increments of adjustment toward the pipe, the pipe will be completely cut.

During the incrementing process, a trip device may be used to increment the tool or the cutting device. This trip device may sometimes crash due to the heavy forces involved which can lead to substantial expense, increased maintenance, increased repair, and increased time delays.

It would therefore be beneficial to provide a trip device which is crash resistant.

SUMMARY

The present disclosure is defined by the following claims, and nothing in this section should be taken as a limitation on those claims.

In one aspect, a pipe machining apparatus is disclosed. The pipe machining apparatus includes a frame, a tool support, an advancement device, and an advancement member. The tool support is coupled to and movable relative to the frame. The tool support is adapted to support a tool and move the tool in a direction toward a pipe at an increment. The advancement device includes an advancement projection fixedly attached to the frame. The advancement projection includes a contact-surface. The advancement member is coupled to the tool support. Upon the advancement member contacting the contact-surface of the advancement projection the advancement member is adapted to advance the tool towards the pipe at the increment. The contact-surface of the advancement projection is shaped to always be in a non-perpendicular contact position with the advancement member.

In another aspect, a pipe machining apparatus is disclosed. The pipe machining apparatus includes a frame, a tool support, a worm gear, a drive gear, a feed screw, an advancement device, and an advancement member. The tool support is coupled to and movable relative to the frame. The tool support is adapted to support a tool and move the tool in a direction toward a pipe at an increment. The drive gear is coupled to the worm gear. The feed screw is coupled to the drive gear. The advancement device includes an advancement projection fixedly attached to the frame. The advancement projection includes a linear contact-surface. The advancement member is coupled to the tool support and to the worm gear. Upon the advancement member contacting the linear contact-surface of the advancement projection the advancement member is adapted to rotate causing the worm gear, the drive gear, and the feed screw to rotate thereby advancing the tool towards the pipe at the increment. The linear contact-surface of the advancement projection is shaped to always be in a non-perpendicular contact position with the advancement member.

In a further aspect, a method of operating a pipe machining apparatus is disclosed. In one step, a frame of the pipe machining apparatus is fixedly coupled to a pipe. In another step, a tool support is moved relative to the frame, wherein the tool support is moveably coupled to the frame. In yet another step, a tool coupled to the tool support is advanced toward the pipe at an increment due to an advancement member, coupled to the tool support, contacting a contact-surface of an advancement projection fixedly attached to the frame, wherein the contact-surface surface of the advancement projection is shaped so that it always contacts the advancement member at a non-perpendicular contact position.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Methods and devices consistent with the present disclosure overcome the disadvantages of conventional pipe machining apparatuses by providing, among other things, a tool support that can rapidly retract a tool upon completion of machining a pipe.

Figure 1:
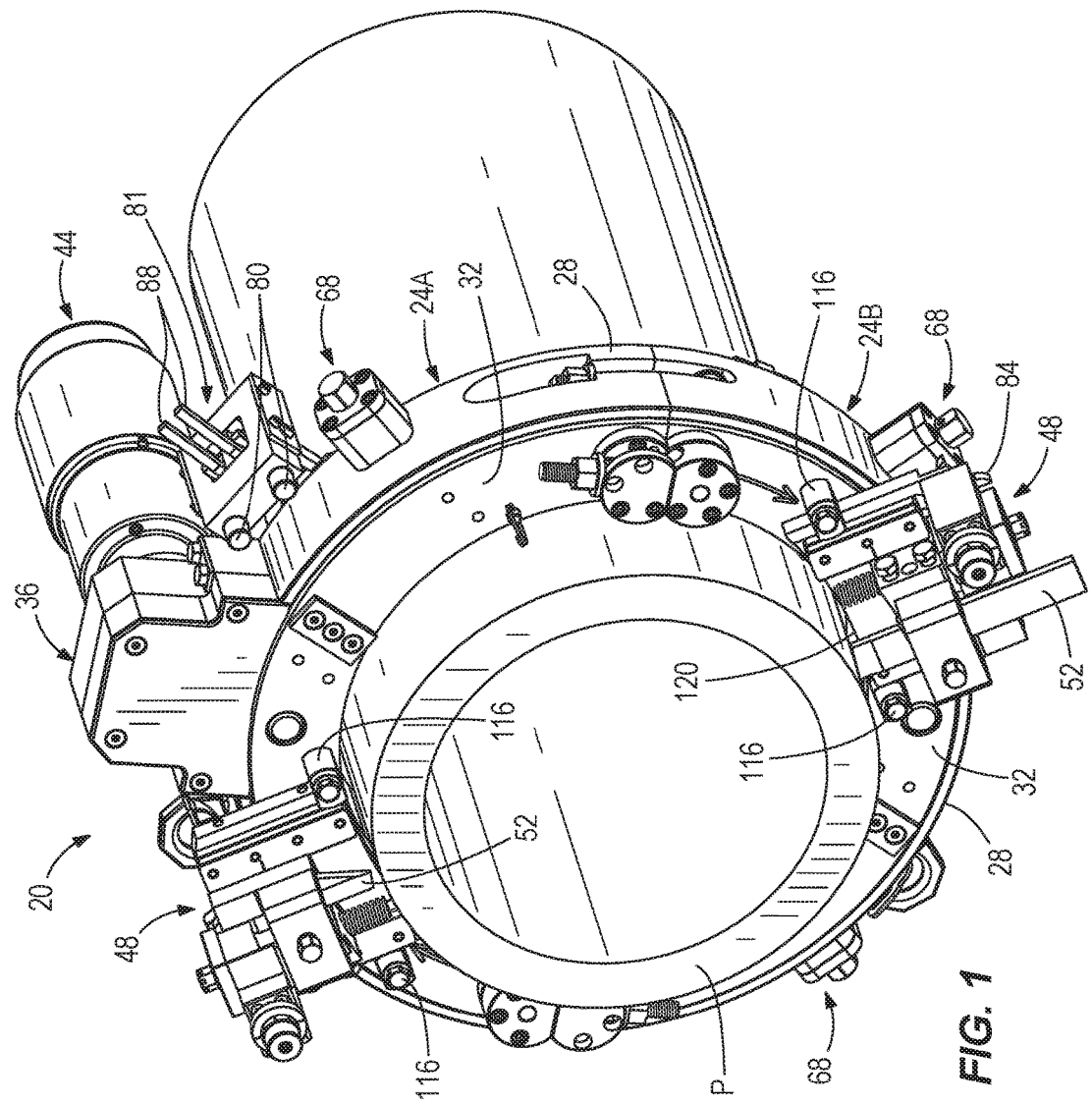
FIG. 1 is a top front perspective view of an exemplary pipe machining apparatus coupled to a pipe, in accordance with one embodiment.
Figure 2:
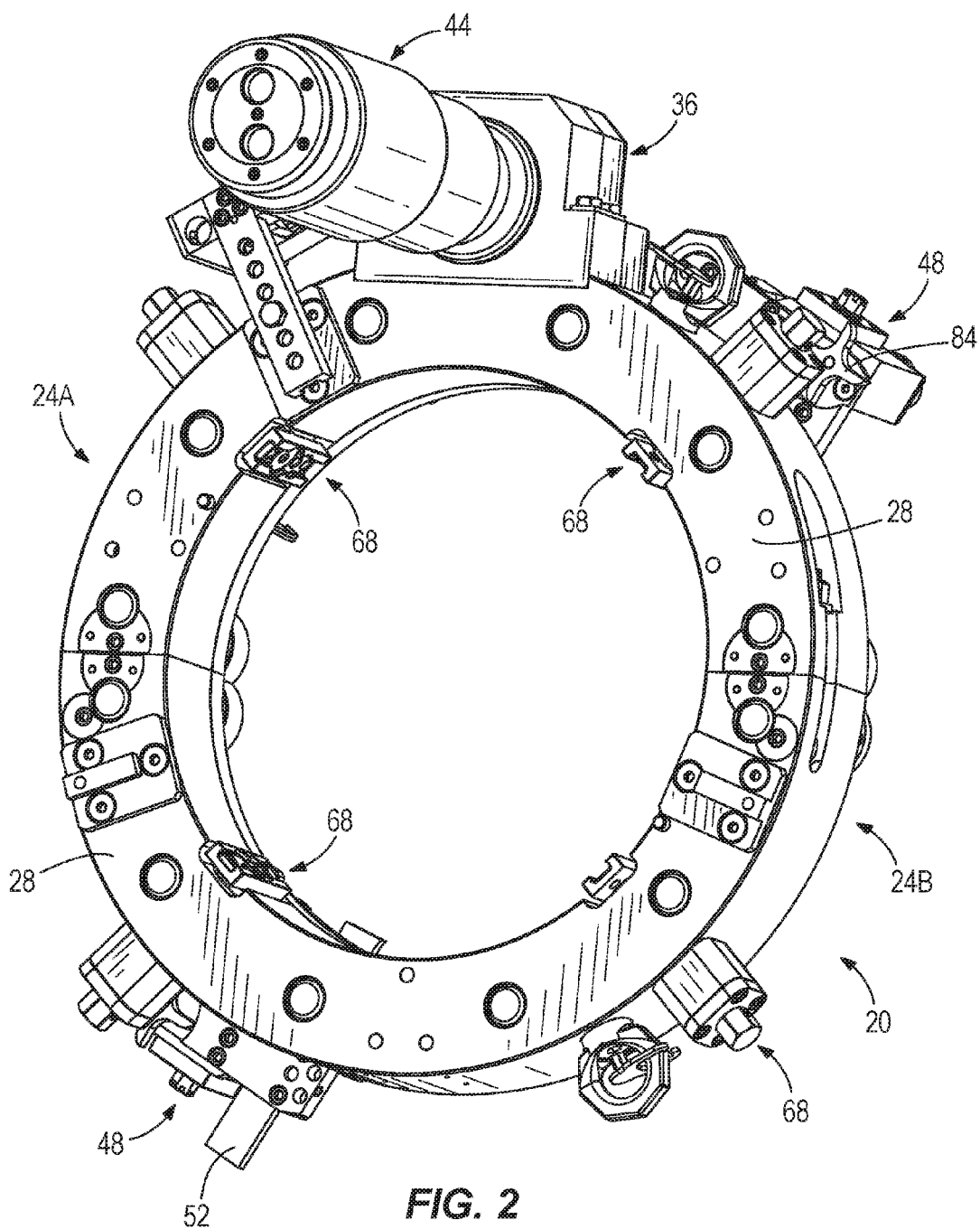
FIG. 2 is a bottom rear perspective view of the pipe machining apparatus illustrated in FIG. 1, in accordance with one embodiment.
Figure 3:
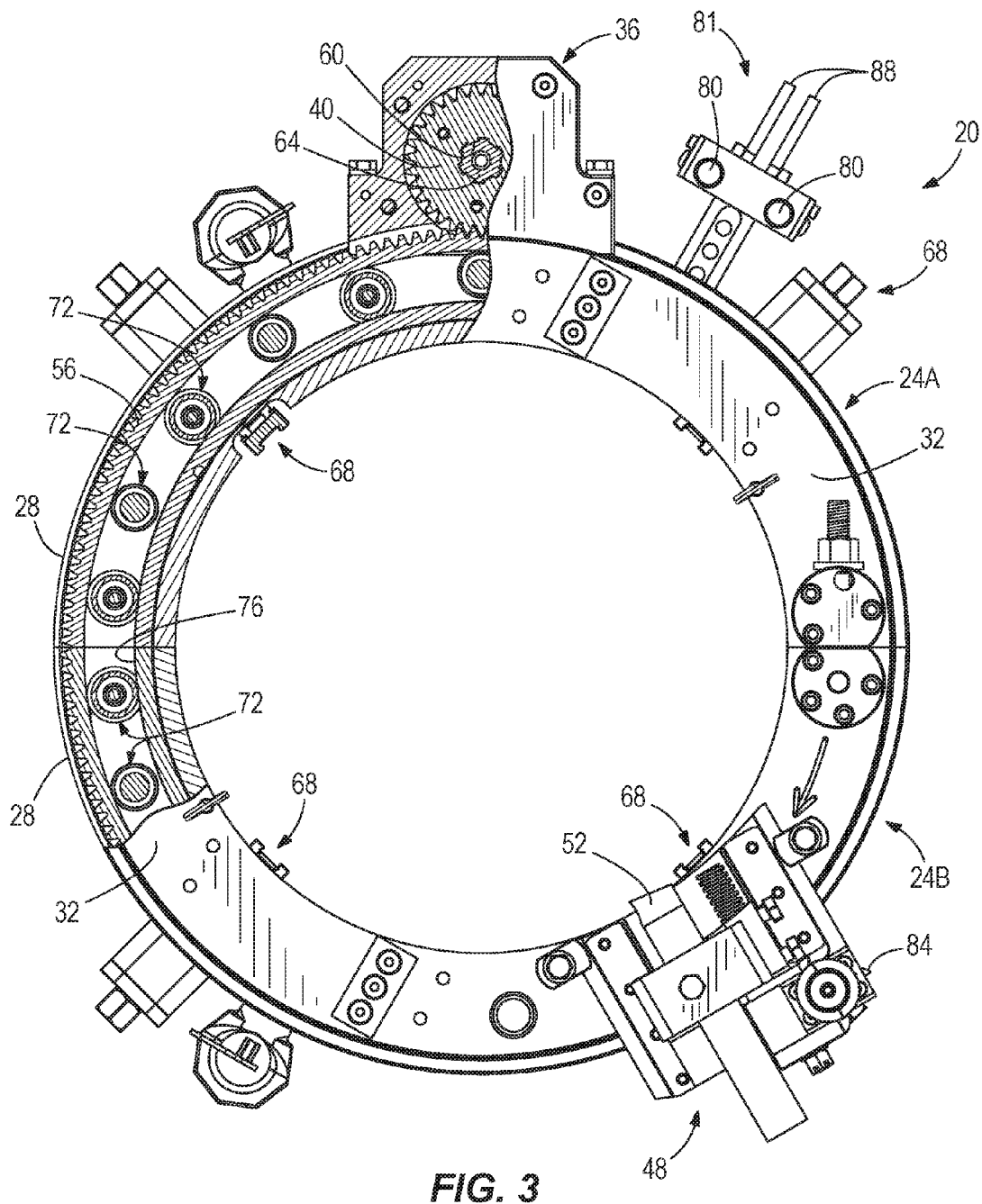
FIG. 3 is a front view of the pipe machining apparatus illustrated in FIG. 1 with a portion thereof broken away to show internal components of the pipe machining apparatus, in accordance with one embodiment.
Figure 4:
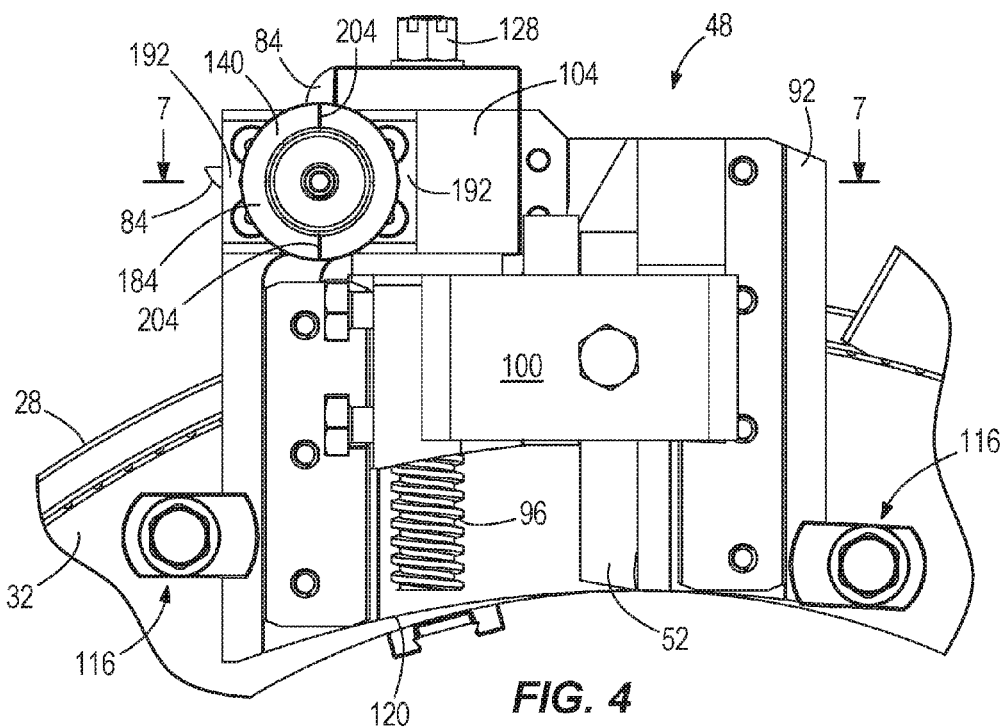
FIG. 4 is an enlarged front view of an exemplary tool support of the pipe machining apparatus shown in FIG. 1 with the tool support illustrated in an engaged position, in accordance with one embodiment.
Figure 6:
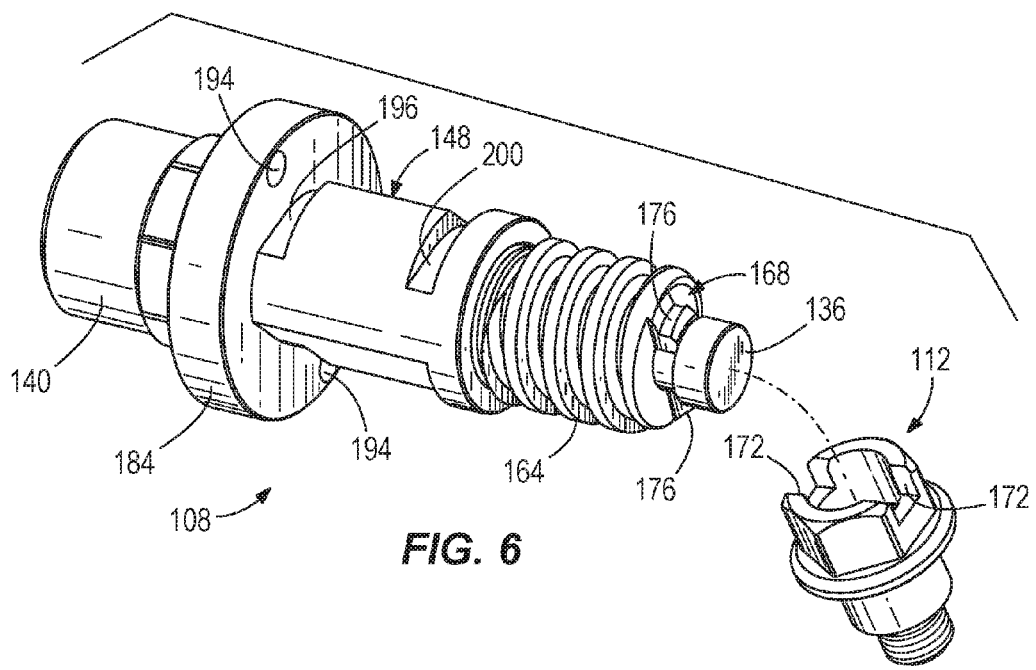
FIG. 6 is a perspective view of an exemplary worm gear assembly and an exemplary drive coupling of the pipe machining apparatus shown in FIG. 4, in accordance with one embodiment.
Figure 5:
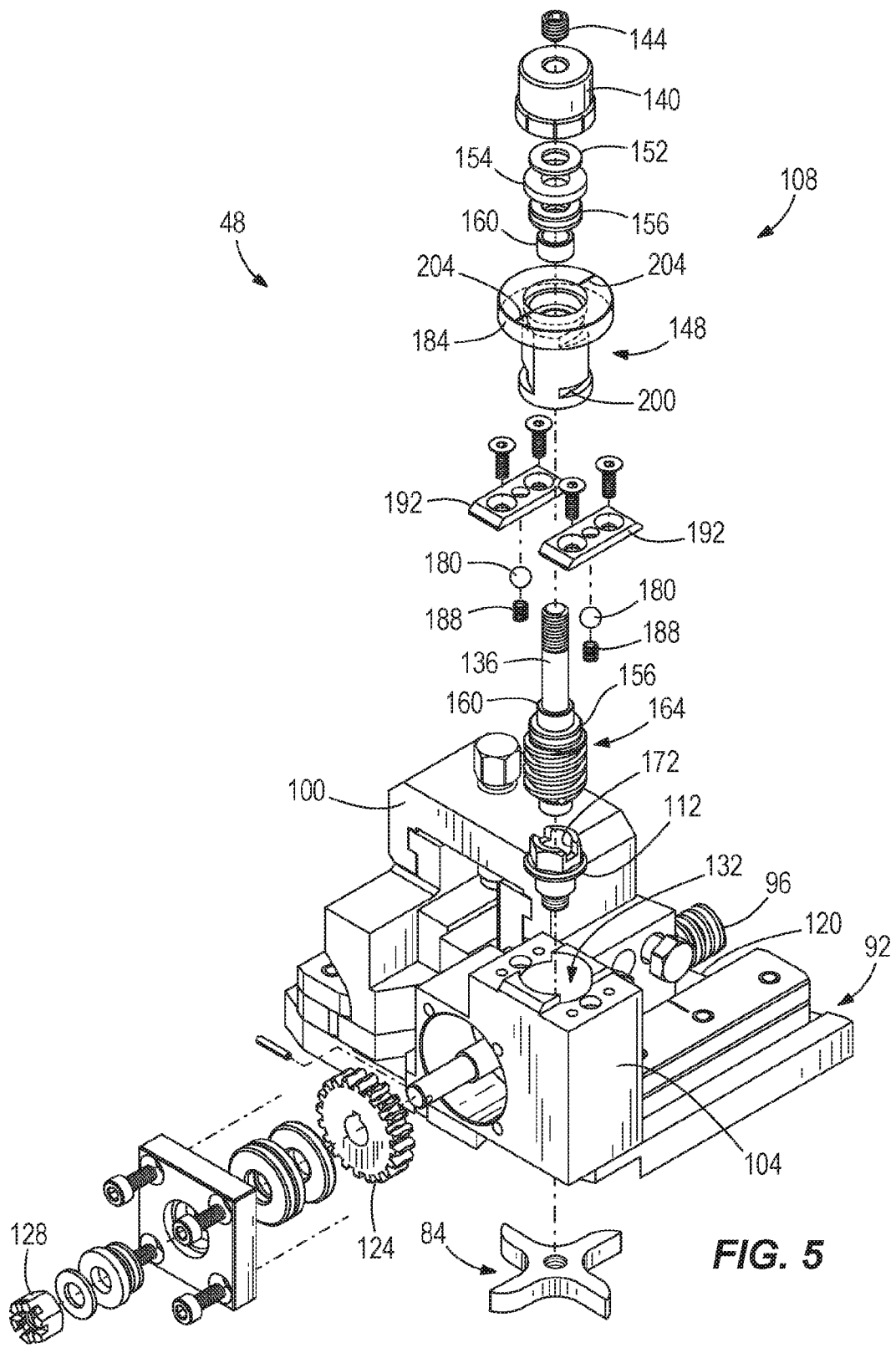
FIG. 5 is an exploded view of the tool support of the pipe machining apparatus shown in FIG. 4, in accordance with one embodiment.
Figure 7:
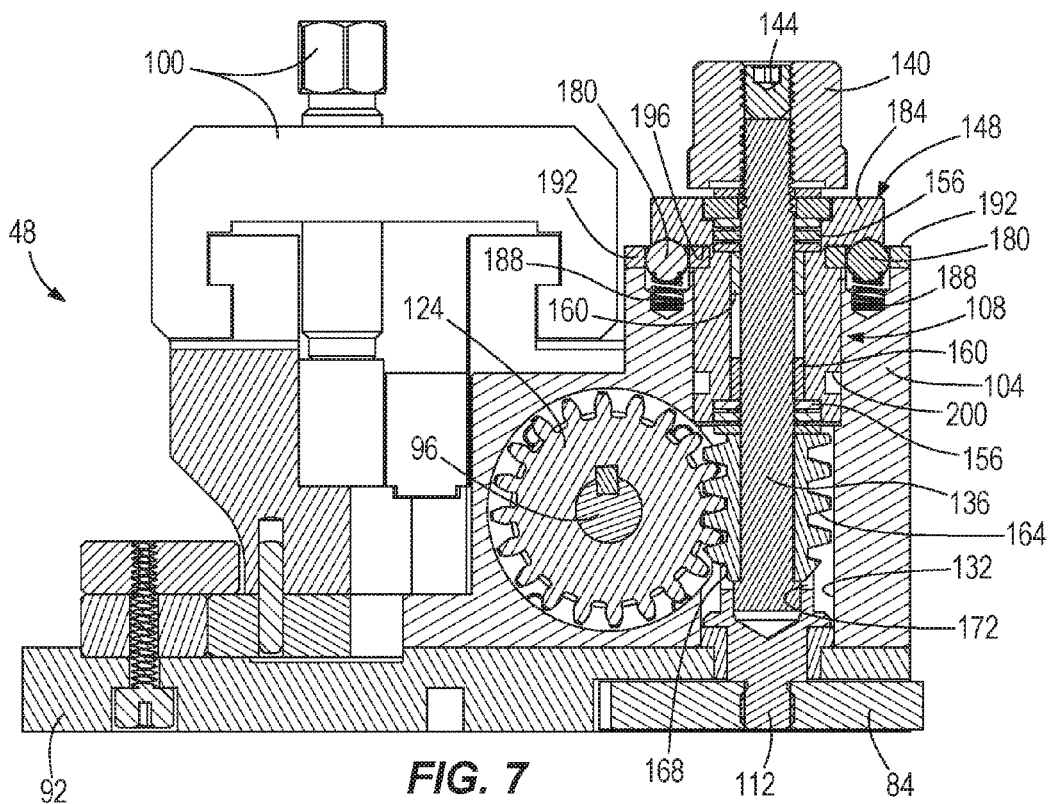
FIG. 7 is a cross-sectional view taken along line 7-7 in FIG. 4 showing the tool support of the pipe machining apparatus in an engaged position, in accordance with one embodiment.
Figure 8:
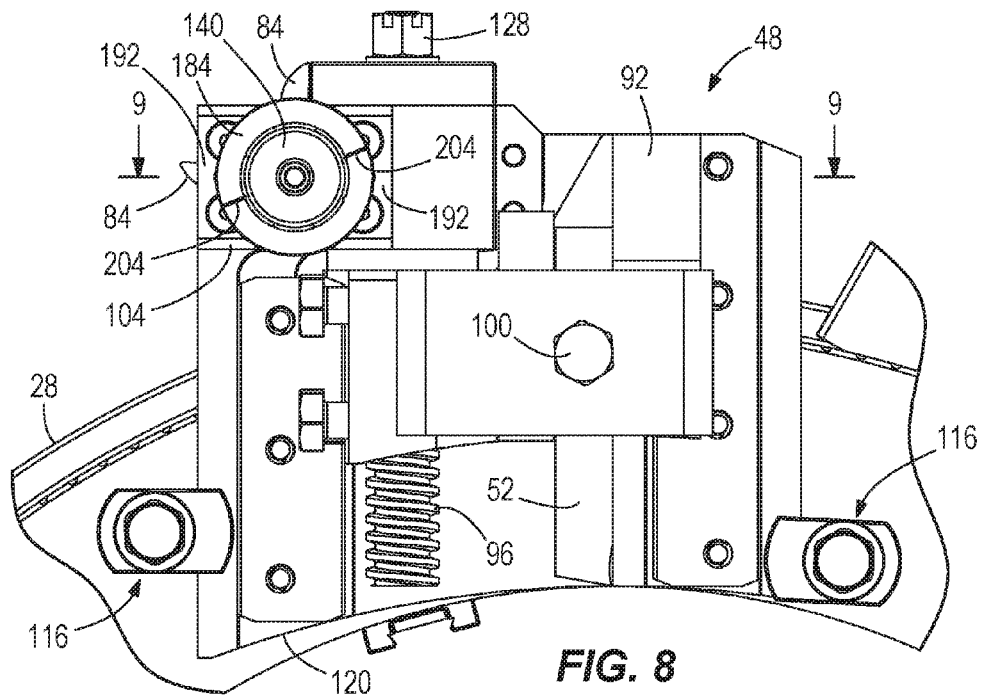
FIG. 8 is an enlarged front view of the tool support of the pipe machining apparatus shown in FIG. 1 with the tool support illustrated in a disengaged position, in accordance with one embodiment.
Figure 9:
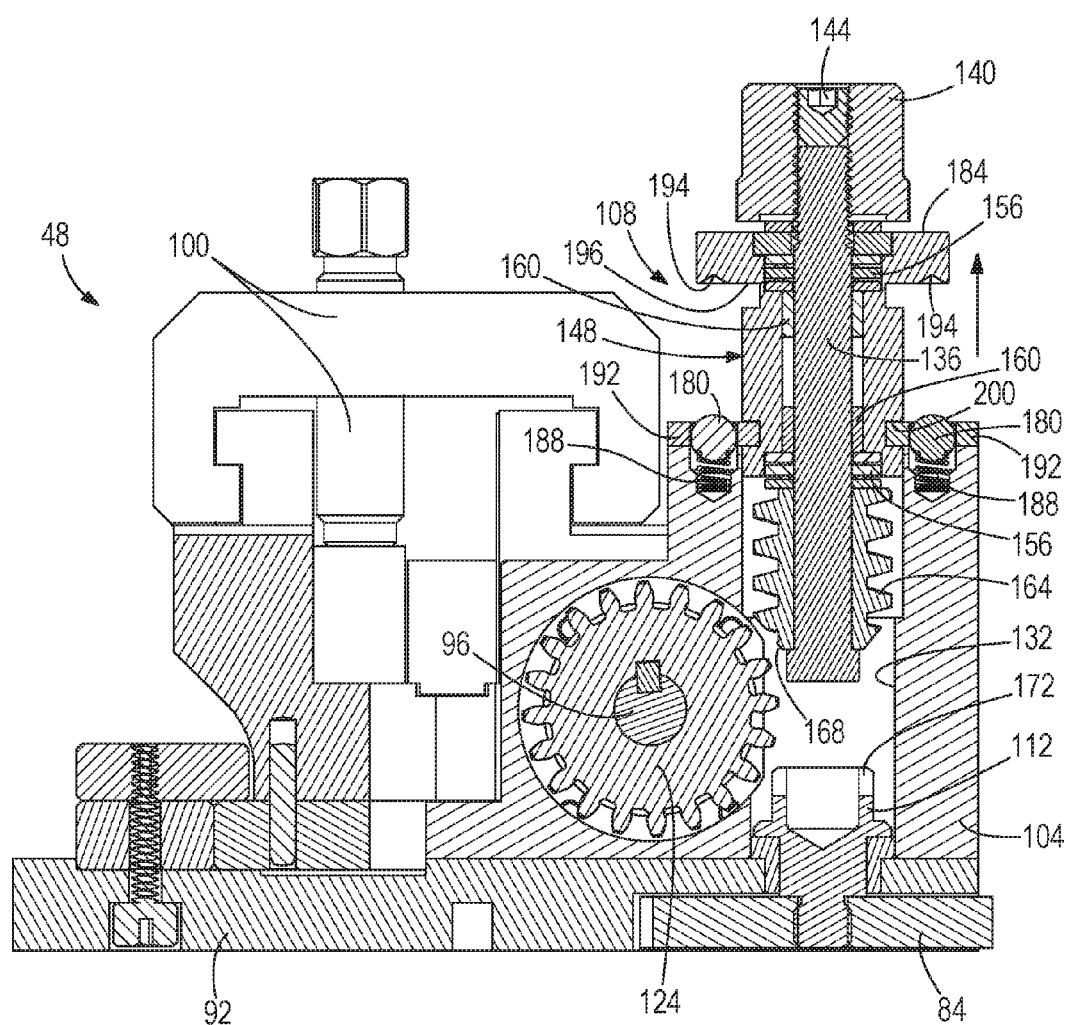
FIG. 9 is a cross-sectional view taken along line 9-9 in FIG. 8 showing the tool support of the pipe machining apparatus in a disengaged position, in accordance with one embodiment.

With reference to FIGS. 1-3, there is shown one exemplary embodiment of a pipe machining apparatus 20 adapted to machine pipes P of varying diameters. In some exemplary embodiments, the apparatus 20 completely cuts through pipes P. In other exemplary embodiments, the apparatus 20 prepares an end of a pipe P for coupling to another pipe. In still other exemplary embodiments, the apparatus 20 both completely cuts and prepares a pipe P for coupling to another pipe.

In the illustrated exemplary embodiment, pipe machining apparatus 20 is formed of two joined-together semicircular sections 24A, 24B and includes a frame 28 and a tool carrier 32. The two sections 24A, 24B together comprise the frame 28 and the tool carrier 32 such that a first portion of the frame 28 and a first portion of the tool carrier 32 is included in one section 24A and a second portion of the frame 28 and a second portion of the tool carrier 32 is included in the other section 24B. The frame 28 has a column 36 extending outwardly of the two semicircular sections 24A, 24B and houses a pinion gear 40 adapted to couple with a suitable drive motor 44, such as an air motor with suitable gear reduction means. The frame 28 is adapted to couple and be fixed relative to a pipe P, and the tool carrier 32 is rotatable relative to the fixed frame 28 and the pipe P. The air motor 44 is adapted to rotate the tool carrier 32 relative to the frame 28 through a gear train in the column 36. The tool carrier 32 has a circular gear rack 56 for meshing with the pinion gear 40 rotatably mounted in column 36. The pinion gear 40 has an opening 60 provided with a polygonal perimeter for receiving a complementary shaped drive head 64 of drive motor 44. Therefore, it can be seen that drive motor 44 is adapted to rotate tool carrier 32 relative to the frame 28 through a gear train provided by pinion gear 40 in column 36 and circular gear rack 56 on the tool carrier 32.

The rotatable tool carrier 32 includes one or more tool supports 48 (two tool supports shown in the illustrated exemplary embodiment), which support tools 52 for performing a cutting or machining operation on the pipe P as the tools 52 rotate circumferentially about the pipe P. The machining operation performed by the tool(s) 52 may form a straight edge perpendicular to a longitudinal extent of the pipe P, a bevel on an end of the pipe P that is transverse to the longitudinal extend of the pipe P and at an angle other than ninety degrees, or an edge of a pipe P having any angle.

The apparatus 20 further includes four adjustable clamp members or coupling members 68 engageable with an exterior of the pipe P and having suitable adjustability to couple and concentrically locate the apparatus 20 to the pipe P.

As best seen in FIG. 3, tool carrier 32 is rotatably mounted on and supported by frame 28 by a plurality of roller bearings 72. The roller bearings 72 ride in a circular bearing race 76 on the interior of tool carrier 32.

A plurality of projections 80 of a projection device 81 are adjustably movable into and out of a path of an advancement member 84 coupled to each tool support 48 to advance the tool 52 toward the pipe P. In the illustrated exemplary embodiment, the projections 80 are circular and the apparatus 20 includes a total of two projections 80 for engaging the advancement member 84, which is star-shaped, of each tool support 48. However, the apparatus 20 may include any number of projections 80 in varying shapes, sizes, configurations, and quantities, and similarly the advancement member 84 may be in varying shapes, sizes, configurations, and quantities. Each projection 80 is coupled to a lever 88 that may be actuated by a user to selectively move the projection 80 into and out of the path of the advancement member 84 of each tool support 48.

With continued reference to FIGS. 1 and 3, and further reference to FIGS. 4-7, a tool support 48 of the tool carrier 32 is illustrated in more detail. The tool support 48 includes a base 92, a feed screw 96 rotatably coupled to the base 92, a tool clamp 100 adapted to support a tool 52 and movable along the feed screw 96, a worm gear housing 104 coupled to the base 92, a worm gear assembly 108 supported by and at least partially positioned within the worm gear housing 104, a drive coupling 112 engageable with the worm gear assembly 108, and the advancement member 84 coupled to the drive coupling 112.

The tool support 48 is coupled to the tool carrier 32 by one or more coupling members 116 (two shown in the exemplary illustrated embodiment) and is adjustable relative to the pipe P to bring an arcuate edge 120 of the base 92 into contact with or in close proximity to an outer periphery of the pipe P. The tool clamp 100 is adapted to support a tool 52 and is movable along the feed screw 96 toward and away from the pipe P (depending on the direction of feed screw rotation). The feed screw 96 can have a variety of different tooth shapes, sizes, pitches, and configurations in order to provide a desired amount of tool movement during use of the apparatus 20. A drive gear 124 is coupled to the feed screw 96 and is engageable with the worm gear assembly 108 to transfer rotation of the worm gear assembly 108 to the feed screw 96. A tool coupling 128 such as, for example, a nut, is coupled to an end of the feed screw 96, thereby providing a location where a tool may couple to and rotate the feed screw 96 as desired.

The worm gear housing 104 defines a cavity 132 therein for receiving at least a portion of the worm gear assembly 108, the drive coupling 112, and the advancement member 84. The worm gear assembly 108 includes a shaft 136, a knob 140, a set screw 144, a housing 148, a first washer 152, a urethane washer 154, two thrust bearings 156, two bushings 160, a worm gear 164, and a key element 168. The worm gear 164 is fixed to the shaft 136 and, in some embodiments, the worm gear 164 may be unitarily formed as one-piece with the shaft 136. The worm gear 164 is coupled or interlaced with the drive gear 124, thereby causing the feed screw 96 to rotate when the worm gear assembly 108 rotates. The knob 140 is coupled to one end of the shaft 136 and the key element 168 is defined in a second end of the shaft 136. The key element 168 is adapted to engage with a similarly configured key feature 172 in the drive coupling 112, which is coupled to the advancement member 84. The key element 168 and complementary key feature 172 in the drive coupling 112 may have a wide variety of configurations. In the illustrated exemplary embodiment, the key element 168 includes a pair of projections 176 extending from an end surface of the worm gear 164. One projection 176 extends from the end surface on one side of the shaft 136 and a second projection 176 extends from the end surface on an opposite side of the shaft 136. The key feature 172 in the drive coupling 112 is comprised of a complementary shaped slot defined in an end of the drive coupling 112. The slot 172 is adapted to receive the key element 168 in an appropriate orientation and cause the worm gear assembly 108 and the drive coupling 112 to rotate together. In this manner, rotation of the advancement member 84 of each tool support 48 causes the worm gear assembly 108 to rotate.

Tool support 48 further includes rollers 180 engageable with a flange 184 of the worm gear assembly housing 148 and springs 188 engaging and applying constant force to the rollers 180. A pair of keeper plates 192 are coupled to the worm gear housing 104 to secure the rollers 180 and springs 188 in place, and each keeper plate 192 defines an aperture in which the associated roller 180 is positioned and retained. The worm gear assembly housing 148 is adapted to engage and roll over the rollers 180, with the rollers 180 applying a force to the flange 184. The flange 184 includes a pair of indentations 194 therein for receiving the rollers 180 when the worm gear assembly 108 is in the engaged position.

During operation of the apparatus 20, the motor 44 rotates the pinion gear 40, which, through engagement with the gear rack 56, causes the tool carrier 32 to rotate relative to the frame 28 and the pipe P. During tool carrier rotation, the advancement member 84 of the tool support 48 contacts the advancement projections 80 (each time the advancement member 84 of the tool support 48 rotates around the pipe P into engagement with the fixed-in-position advancement projections 80) and the advancement member 84 rotates as a result of this contact, thereby rotating the worm gear assembly 108 due to the engagement between the key element 168 and key feature 172. Rotation of the worm gear 164 causes the drive gear 124 to rotate, which rotates the feed screw 96 to ultimately move the tool clamp 100 and tool 52 toward the pipe P to perform deeper machining into the pipe P. The tool 52 advances until the pipe P is machined to a desired extent (e.g., until the pipe is completely cut or parted).

Figure 10:
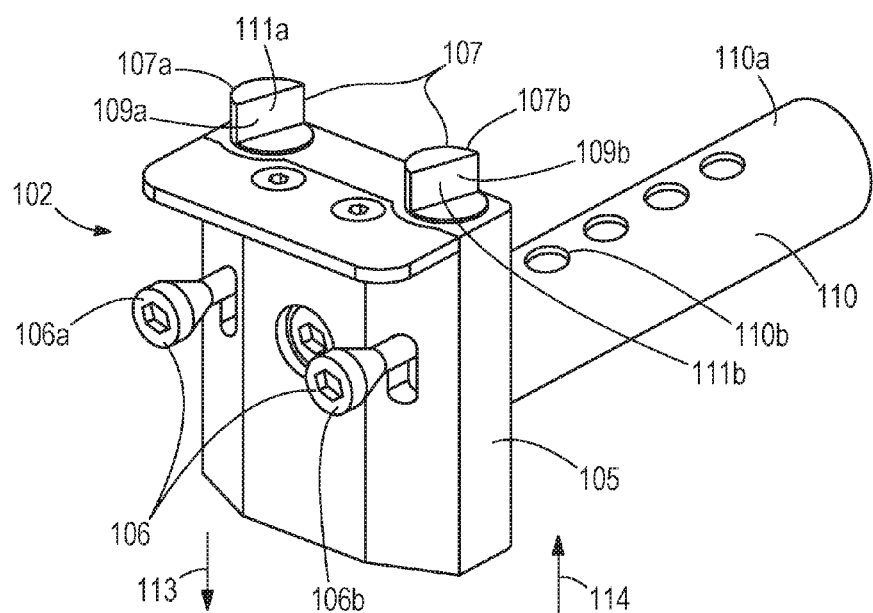
FIG. 10 illustrates a perspective view of an embodiment of a projection device which may be substituted for a projection device shown in the embodiment of FIGS. 1-9.

FIG. 10 illustrates a perspective view of another embodiment of a projection device 102 which may be substituted for the projection device 81 of the embodiment of FIGS. 1-9. The projection device 102 comprises a housing 105, movement devices 106, advancement projections 107, and a position control member 110. The movement devices 106, comprising movement devices 106a and 106b, are configured to separately control the position of their respective advancement projections 107 comprising advancement projections 107a and 107b. When the movement devices 106, comprising movement devices 106a and 106b, are moved downward in direction 113 their respective connected advancement projections 107, comprising advancement projections 107a and 107b, move downward in direction 113 so that they are disposed within the housing 105. When the movement devices 106, comprising movement devices 106a and 106b, are moved upward in direction 114, their respective connected advancement projections 107, comprising advancement projections 107a and 107b, move upward in direction 114 so that they are disposed out of and above the housing 105. The advancement projections 107a and 107b comprise slotted semi-circles having slots 109a and 109b rather than full circles as in the embodiment of FIGS. 1-9. The slots 109a and 109b comprise respective contact-surfaces 111a and 111b which are shaped to always be in a non-perpendicular contact position with the advancement member 84 (discussed and shown in FIGS. 13-19). The contact-surface 111a and 111b are linear. In other embodiments, the advancement projections 107a and 107b and contact-surfaces 111a and 111b may vary in shape, configuration, size, and quantity.

The position control member 110 comprises a stem 110a comprising a plurality of spaced-apart holes 110b. The spaced-apart holes 110b allow for the position of the position control member 110 to be changed relative to the fixed frame 28 (shown in FIG. 3) to which it is attached by moving the position control member 110 relative to the fixed frame 28 into the desired position and then attaching one or more fasteners (not shown) into the appropriate spaced-apart hole 110b to keep the position control member 110 in the desired position relative to the fixed frame 28.

Figures 11, 12:
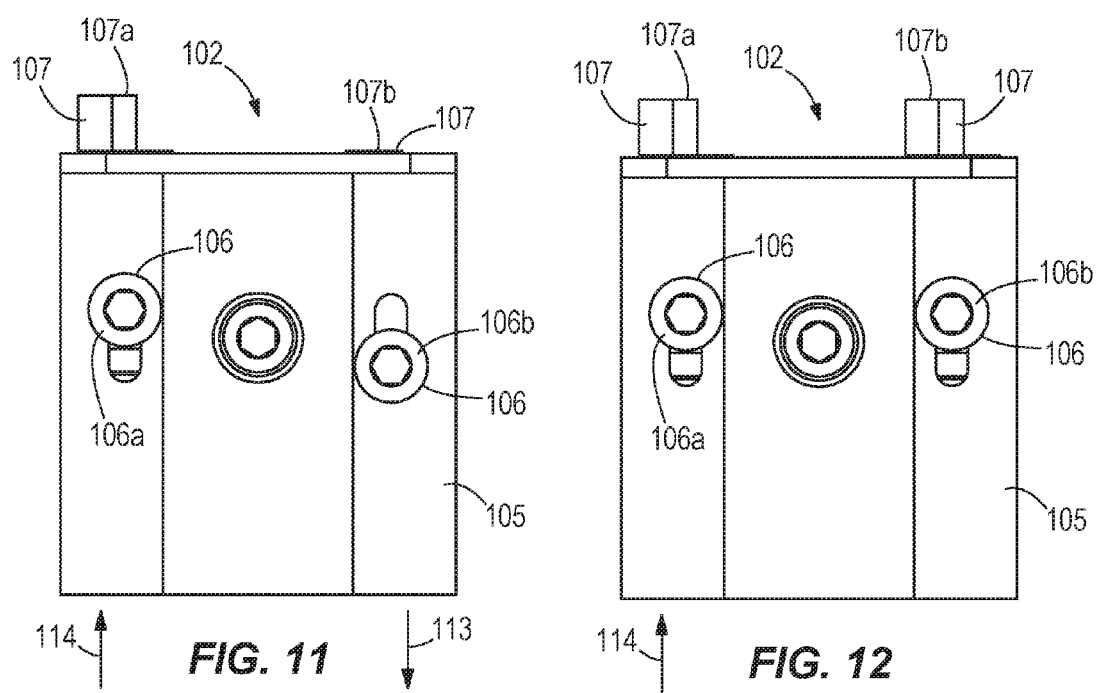
FIG. 11 illustrates a front view of the projection device of the embodiment of FIG. 10 with advancement projections disposed in one set of positions.
FIG. 12 illustrates a front view of the projection device of the embodiment of FIG. 10 with advancement projections disposed in another set of positions.

FIG. 11 illustrates a front view of the projection device 102 of the embodiment of FIG. 10 with the advancement projections 107 disposed in one set of positions. As shown in FIG. 11, movement device 106a has been moved upward in direction 114 thereby moving its connected advancement projection 107a upward in direction 114 to be disposed out of and above the housing 105. Movement device 106b has been moved downward in direction 113 thereby moving its connected advancement projection 107b downward in direction 113 to be disposed within the housing 105. It is noted that with only one advancement projection 107a disposed in the up position, that the advancement member 84 of the tool support 48 (as discussed with respect to the embodiment of FIGS. 1-9) will only make contact with the one advancement projection 107a and will therefore only feed the tool 52 into the pipe P (as discussed with respect to the embodiment of FIGS. 1-9) the amount the one advancement projection 107a moves the advancement member 84.

FIG. 12 illustrates a front view of the projection device 102 of the embodiment of FIG. 10 with the advancement projections 107 disposed in another set of positions. As shown in FIG. 12, movement device 106a has been moved upward in direction 114 thereby moving its connected advancement projection 107a upward in direction 114 to be disposed out of and above the housing 105. Movement device 106b has been moved upward in direction 114 thereby moving its connected advancement projection 107b upward in direction 114 to be disposed out of and above the housing 105. It is noted that with both advancement projections 107a and 107b disposed in the up positions, that the advancement member 84 of the tool support 48 (as discussed with respect to the embodiment of FIGS. 1-9) will makes contact with both advancement projections 107a and 107b and will therefore feed the tool 52 into the pipe P (as discussed with respect to the embodiment of FIGS. 1-9) the amounts both advancement projections 107a and 107b move the advancement member 84. In further embodiments, additional movement devices 106 can be added to the projection device 102 with respective additional advancement projections 107 to further control how far the tool 52 is fed into the pipe P during each rotation of the tool support 48 around the pipe P (as discussed with respect to the embodiment of FIGS. 1-9).

Figure 13:
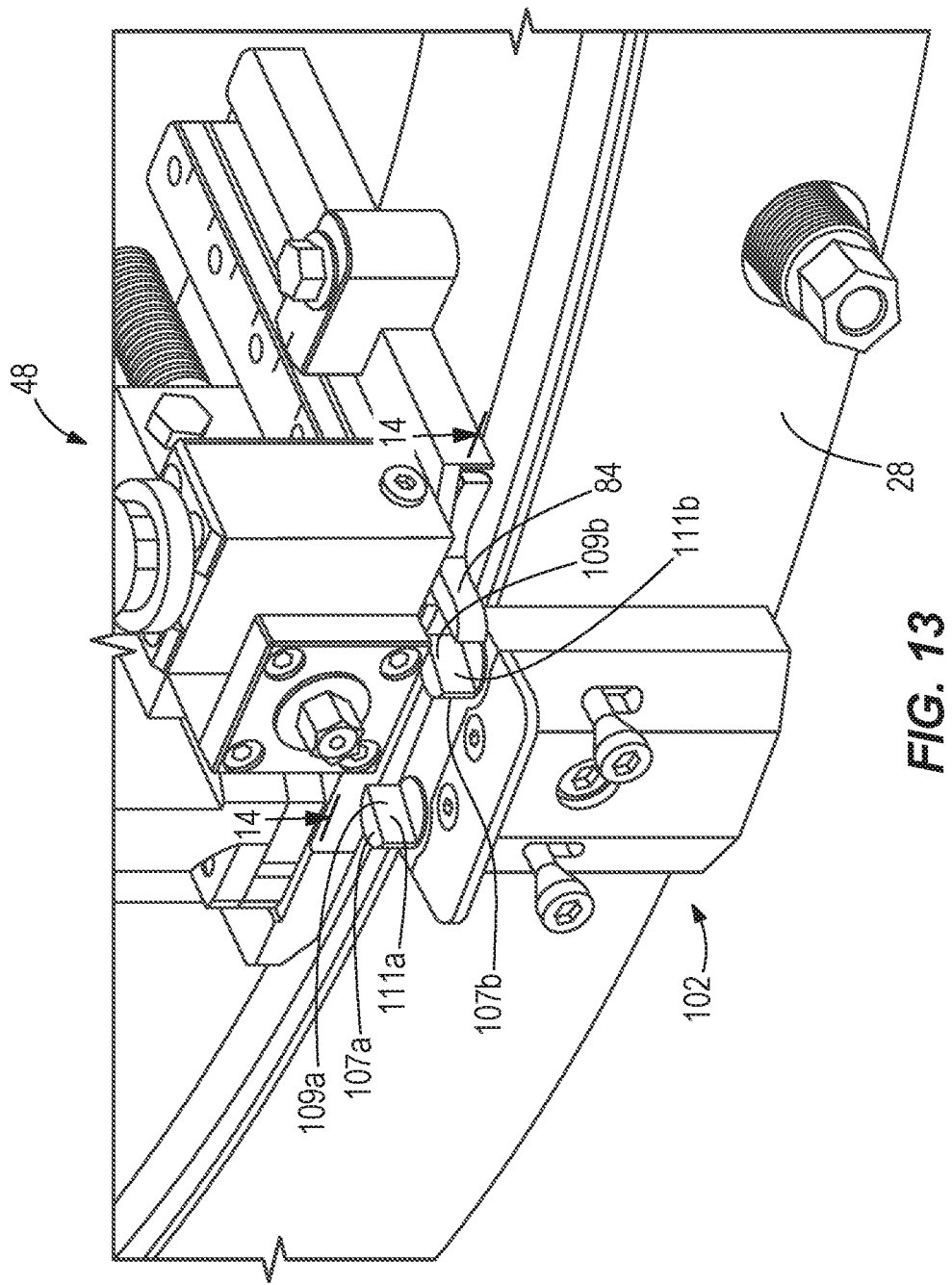
FIG. 13 illustrates a partial perspective view of the projection device of the embodiment of FIG. 10 disposed in a fixed position attached to a fixed frame of the embodiment of FIGS. 1-9 with a tool support aligned directly above the projection device and an advancement member of the tool support contacting a contact-surface of an advancement projection which is oriented in its upward position as shown in FIG. 12.

FIG. 13 illustrates a partial perspective view of the projection device 102 of the embodiment of FIG. 10 disposed in a fixed position attached to the fixed frame 28 of the embodiment of FIGS. 1-9 with the tool support 48 aligned directly above the projection device 102 and the advancement member 84 of the tool support 48 contacting the contact-surface 111b of the advancement projection 107b which is oriented in its upward position as shown in FIG. 12. As discussed previously with respect to the embodiment of FIGS. 1-9, during operation of the apparatus 20, the motor 44 rotates the pinion gear 40, which, through engagement with the gear rack 56, causes the tool carrier 32 to rotate relative to the frame 28 and the pipe P. During tool carrier rotation, the advancement member 84 of the tool support 48 contacts the contact-surfaces 111a and 111b of the advancement projections 107a and 107b (each time the advancement member 84 of the tool support 48 rotates around the pipe P into engagement with the fixed-in-position contact-surfaces 111a and 111b of the advancement projections 107a and 107b) and the advancement member 84 rotates as a result of this contact, thereby rotating the worm gear assembly 108 due to the engagement between the key element 168 and key feature 172 (as discussed previously in FIGS. 1-9). Rotation of the worm gear 164 causes the drive gear 124 to rotate, which rotates the feed screw 96 to ultimately move the tool clamp 100 and tool 52 toward the pipe P to perform deeper machining into the pipe P (as discussed previously in FIGS. 1-9). The tool 52 advances until the pipe P is machined to a desired extent (e.g., until the pipe is completely cut or parted).

The semi-circular, slotted shape of the advancement projections 107a and 107b, comprising the slotted semi-circles having slots 109a and 109b rather than full circles as in the embodiment of FIGS. 1-9, makes the contact of the advancement member 84 of the tool support 48 with the contact-surfaces 111a and 111b of the advancement projections 107a and 107b crash resistant. This is due to the contact-surfaces 111a and 111b of the advancement projections 107a and 107b preventing the advancement member 84 of the tool support 48 from contacting the advancement projections 107a and 107b at right angles (as it would if the contact-surfaces 111a and 111b of the advancement projections 107a and 107b comprised full circles as in the embodiment of FIGS. 1-9) thereby preventing a hard impact crash.

Figure 14:
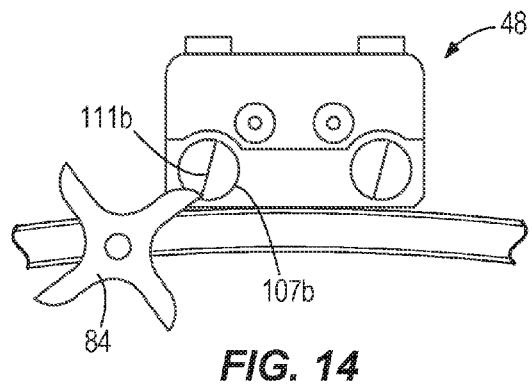
FIG. 14 illustrates a cross-sectional view through line 14-14 of the embodiment of FIG. 13 with the advancement member of the tool support first coming into contact with a fixed-in-position contact-surface of one of the advancement projections at a severe angle.

FIG. 14 illustrates a cross-sectional view through line 14-14 of the embodiment of FIG. 13 with the advancement member 84 of the tool support 48 first coming into contact with the fixed-in-position contact-surface 111b of the advancement projection 107b at a severe angle. It is noted that the semi-circular shape of the fixed-in-position contact-surface 111b of the advancement projection 107b prevents a crash condition which may have occurred if the fixed-in-position contact-surface 111b of the advancement projection 107b had comprised a full circle.

Figure 15:
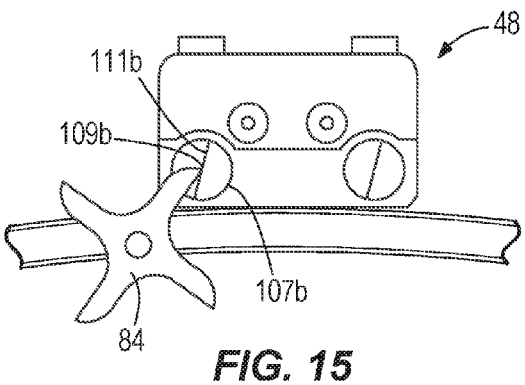
FIG. 15 illustrates the cross-sectional view of the embodiment of FIG. 14 with the advancement member of the tool support having advanced further than its position of FIG. 14 to ride up a slot of the fixed-in-position contact-surface of one of the advancement projections.

FIG. 15 illustrates the cross-sectional view of the embodiment of FIG. 14 with the advancement member 84 of the tool support 48 having advanced further than its position of FIG. 14 (as the tool support 48 and its advancement member 84 continue to rotate around the pipe P [discussed in FIGS. 1-9] relative to the fixed-in-position contact-surface 111b of the advancement projection 107b) to ride up the slot 109b of the fixed-in-position contact-surface 111b of the advancement projection 107b.

Figure 16:
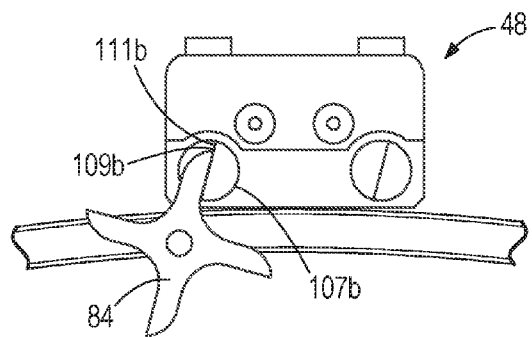
FIG. 16 illustrates the cross-sectional view of the embodiment of FIG. 15 with the advancement member of the tool support having advanced further than its position of FIG. 15 to ride up the slot of the fixed-in-position contact-surface of one of the advancement projections.

FIG. 16 illustrates the cross-sectional view of the embodiment of FIG. 15 with the advancement member 84 of the tool support 48 having advanced further than its position of FIG. 15 (as the tool support 48 and its advancement member 84 continue to rotate around the pipe P [discussed in FIGS. 1-9] relative to the fixed-in-position contact-surface 111b of the advancement projection 107b) to ride up the slot 109b of the fixed-in-position contact-surface 111b of the advancement projection 107b.

Figure 17:
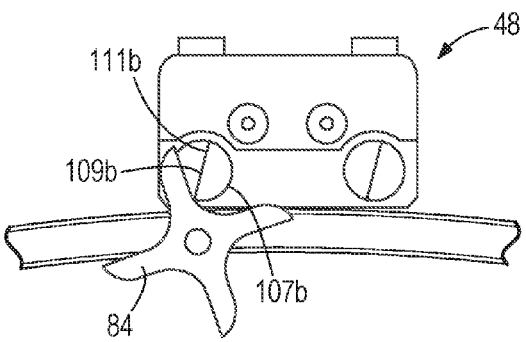
FIG. 17 illustrates the cross-sectional view of the embodiment of FIG. 14 with the advancement member of the tool support having advanced further than its position of FIG. 16 to begin to ride out of the slot of the fixed-in-position contact-surface of one of the advancement projections.

FIG. 17 illustrates the cross-sectional view of the embodiment of FIG. 14 with the advancement member 84 of the tool support 48 having advanced further than its position of FIG. 16 (as the tool support 48 and its advancement member 84 continue to rotate around the pipe P [discussed in FIGS. 1-9] relative to the fixed-in-position contact-surface 111b of the advancement projection 107b) to begin to ride out of the slot 109b of the fixed-in-position contact-surface 111b of the advancement projection 107b.

Figure 18:
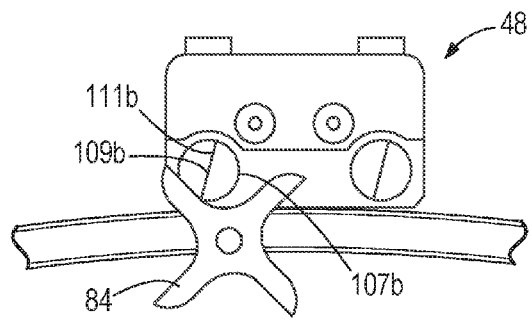
FIG. 18 illustrates the cross-sectional view of the embodiment of FIG. 14 with the advancement member of the tool support having advanced further than its position of FIG. 17 to continue to ride out of the slot of the fixed-in-position contact-surface of one of the advancement projections.

FIG. 18 illustrates the cross-sectional view of the embodiment of FIG. 14 with the advancement member 84 of the tool support 48 having advanced further than its position of FIG. 17 (as the tool support 48 and its advancement member 84 continue to rotate around the pipe P [discussed in FIGS. 1-9] relative to the fixed-in-position contact-surface 111b of the advancement projection 107b) to continue to ride out of the slot 109b of the fixed-in-position contact-surface 111b of the advancement projection 107b.

Figure 19:
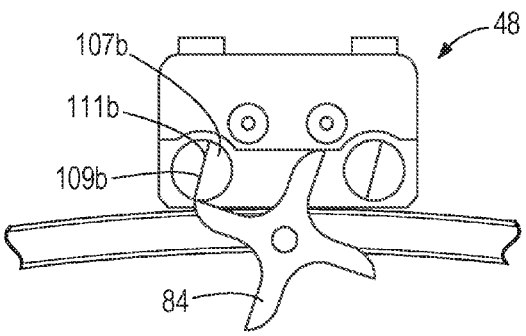
FIG. 19 illustrates the cross-sectional view of the embodiment of FIG. 14 with the advancement member of the tool support having advanced further than its position of FIG. 18 to move completely out of the slot of the fixed-in-position contact-surface of one of the advancement projections thereby completing one feed cycle of a tool deeper into a pipe.

FIG. 19 illustrates the cross-sectional view of the embodiment of FIG. 14 with the advancement member 84 of the tool support 48 having advanced further than its position of FIG. 18 (as the tool support 48 and its advancement member 84 continue to rotate around the pipe P [discussed in FIGS. 1-9] relative to the fixed-in-position contact-surface 111b of the advancement projection 107b) to move completely out of the slot 109b of the fixed-in-position contact-surface 111b of the advancement projection 107b thereby completing one feed cycle of the tool 52 deeper into the pipe P (discussed in FIGS. 1-9).

In other embodiments, the projection device 81/102 and its components may be further varied in shape, size, number, orientation, configuration, location, and function in order to provide crash resistance of the advancement member 84 of the tool support 48 when it contacts the contact-surface(s) 111b of the advancement projection(s) 107 of the projection device 81/102.

In another embodiment, a method of operating a pipe machining apparatus is disclosed. The method may utilize any of the embodiments of the pipe machining apparatus disclosed herein. In other embodiments, the method may utilize varying machining apparatus. In one step, a frame of the pipe machining apparatus is fixedly coupled to a pipe. In another step, a tool support, moveably coupled to the frame, is moved relative to the frame. In yet another step, a tool coupled to the tool support is advanced toward the pipe at an increment due to an advancement member, coupled to the tool support, contacting a contact-surface of an advancement projection fixedly attached to the frame. The contact-surface of the advancement projection is shaped so that it always contacts the advancement member at a non-perpendicular contact position.

In one embodiment of the method, the advancement member contacting the contact-surface of the advancement projection comprises the advancement member contacting a linear contact-surface. In another embodiment of the method, the advancement member contacting the contact-surface of the advancement projection comprises a star contacting a linear contact-surface. In still another embodiment of the method, the advancement member contacting the contact-surface of the advancement projection comprises a star contacting a linear contact-surface of a semi-circle. In yet another embodiment of the method, the shape of the contact-surface makes the contact of the advancement member with the contact-surface crash-resistant. In other embodiments of the method, one or more steps of the method may be modified in substance or in order, one or more steps of the method may not be followed, or one or more additional steps may be added.

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A pipe machining apparatus comprising:
   a frame;
   a tool support coupled to and movable relative to the frame, wherein the tool support is adapted to support a tool and move the tool in a direction toward a pipe at an increment;
   an advancement device comprising a plurality of advancement projections fixedly attached to the frame, each of the plurality of advancement projections comprising a respective linear contact-surface; and
   an advancement member coupled to the tool support, wherein upon the advancement member contacting the contact-surface of the advancement projection the advancement member is adapted to advance the tool towards the pipe at the increment;
   wherein the plurality of the advancement projections are adjustably moveable into and out of a path of the advancement member.

2. The pipe machining apparatus of claim 1 wherein the advancement projection comprises a semi-circle.

3. The pipe machining apparatus of claim 1 wherein the advancement member comprises a star.

4. The pipe machining apparatus of claim 1 wherein the plurality of advancement projections each comprise a respective semi-circle and the advancement member comprises a star.

5. The pipe machining apparatus of claim 1 further comprising a drive gear coupled to a worm gear.

6. The pipe machining apparatus of claim 5 further comprising a feed screw coupled to the drive gear.

7. The pipe machining apparatus of claim 6 wherein the advancement member is coupled to the worm gear.

8. The pipe machining apparatus of claim 7 wherein upon the advancement member contacting the respective linear contact-surface of each of the plurality of advancement projections the advancement member is adapted to rotate causing the worm gear, the drive gear, and the feed screw to rotate thereby advancing the tool towards the pipe at the increment.

9. A pipe machining apparatus comprising:
   a frame;
   a tool support coupled to and movable relative to the frame, wherein the tool support is adapted to support a tool and move the tool in a direction toward a pipe at an increment;
   a worm gear;
   a drive gear coupled to the worm gear;
   a feed screw coupled to the drive gear;
   an advancement device comprising a plurality of advancement projections fixedly attached to the frame, each of the plurality of advancement projections comprising a respective contact-surface; and
   an advancement member coupled to the tool support and to the worm gear, wherein upon the advancement member contacting the respective contact-surface of each of the plurality of advancement projections the advancement member is adapted to rotate causing the worm gear, the drive gear, and the feed screw to rotate thereby advancing the tool towards the pipe at the increment;
   wherein the plurality of the advancement projections are adjustably moveable into and out of a path of the advancement member.

10. The pipe machining apparatus of claim 9 wherein each of the plurality of the advancement projections comprise a semi-circle.

11. The pipe machining apparatus of claim 9 wherein the advancement member comprises a star.

12. The pipe machining apparatus of claim 9 wherein each of the plurality of advancement projections comprise a semi-circle and the advancement member comprises a star.

\* \* \* \* \*